United States Patent
Neff (10) Patent No.: US 7,360,094 B2
(45) Date of Patent: Apr. 15, 2008

(54) VERIFIABLE SECRET SHUFFLES AND THEIR APPLICATION TO ELECTRONIC VOTING

(75) Inventor: C. Andrew Neff, Bellevue, WA (US)

(73) Assignee: Demoxi, Inc., Bellevue, WA (US)

( * ) Notice: Subject to any disclaimer, the term of this patent is extended or adjusted under 35 U.S.C. 154(b) by 767 days.

(21) Appl. No.: 10/484,931

(22) PCT Filed: Mar. 25, 2002

(86) PCT No.: PCT/US02/09264

§ 371 (c)(1),
(2), (4) Date: Jan. 22, 2004

(87) PCT Pub. No.: WO02/077929

PCT Pub. Date: Oct. 3, 2002

(65) Prior Publication Data

US 2005/0028009 A1    Feb. 3, 2005

Related U.S. Application Data

(60) Provisional application No. 60/313,003, filed on Aug. 16, 2001, provisional application No. 60/312,671, filed on Aug. 15, 2001, provisional application No. 60/311,680, filed on Aug. 9, 2001.

(51) Int. Cl.
   *H04L 9/00* (2006.01)
(52) U.S. Cl. ................. 713/179; 713/151; 705/12
(58) Field of Classification Search ........... 713/179, 713/151, 150, 180, 189; 380/28, 30; 705/12, 705/50

See application file for complete search history.

(56) References Cited

U.S. PATENT DOCUMENTS 4,774,665 A    9/1988   Webb (Continued)

FOREIGN PATENT DOCUMENTS

CA    2176990    11/1996

(Continued)

OTHER PUBLICATIONS

Abe, M., "Universally Verifiable Mix-net with Verification Work Independent of the Number of Mix-servers," Advances in Cryptology—EUROCRYPT '98: International Conference on the Theory and Application of Cryptographic Techniques, pp. 437-447, vol. 1403, May/Jun. 1998 Proceedings, Espoo, Finland, Springer-Verlag GmbH, Germany.

(Continued)

*Primary Examiner*—Ellen Tran
(74) *Attorney, Agent, or Firm*—Perkins Coie LLP (57) ABSTRACT

We present a mathematical construct which provides a cryptographic protocol to (verifiably shuffle) a sequence of (k) modular integers, and discuss its application to secure, universally verifiable, multi-authority election schemes. The output of the shuffle operation is another sequence of (k) modular integers, each of which is the same secret power of a corresponding input element, but the order of elements in the output is kept secret. Though it is a trivial matter for the "shuffler" (who chooses the permutation of the elements to be applied) to compute the output from the input, the construction is important because it provides a linear size proof of correctness for the output sequence (i.e. a proof that it is of the form claimed) that can be checked by one or more arbitrary verifiers. The protocol is shown to be honest-verifier zeroknowledge in a special case, and is computational zeroknowledge in general. On the way to the final result, we also construct a generalization of the well known Chaum-Pedersen protocol for knowledge of discrete logarithm equality ([3], [2]). In fact, the generalization specializes (exactly) to the Chaum-Pedersen protocol in the case (k)=2. This result may be of interest on its own. An application to electronic voting is given that matches the features of the best current protocols with significant efficiency improvements. An alternative application to electronic voting is also given that introduces an entirely new paradigm for achieving (Universally Verifiable) elections.

26 Claims, 2 Drawing Sheets

U.S. PATENT DOCUMENTS

| | | | |
|---|---|---|---|
| 5,278,753 | A | 1/1994 | Graft, III |
| 5,400,248 | A | 3/1995 | Chisholm |
| 5,495,532 | A | 2/1996 | Kilian et al. |
| 5,521,980 | A | 5/1996 | Brands |
| 5,610,383 | A | 3/1997 | Chumbley |
| 5,682,430 | A * | 10/1997 | Kilian et al. ............... 380/30 |
| 5,708,714 | A | 1/1998 | López et al. |
| 5,717,759 | A | 2/1998 | Micali |
| 5,864,667 | A | 1/1999 | Barkan |
| 5,875,432 | A | 2/1999 | Sehr |
| 5,878,399 | A | 3/1999 | Peralto |
| 5,970,385 | A | 10/1999 | Pykalisto |
| 6,021,200 | A | 2/2000 | Fischer |
| 6,081,793 | A * | 6/2000 | Challener et al. ............ 705/50 |
| 6,092,051 | A | 7/2000 | Kilian et al. |
| 6,250,548 | B1 | 6/2001 | McClure et al. |
| 6,317,833 | B1 | 11/2001 | Jakobsson |
| 6,523,115 | B1 | 2/2003 | Ono et al. |
| 6,540,138 | B2 | 4/2003 | Hall et al. |
| 6,550,675 | B2 | 4/2003 | Davis et al. |
| 6,769,613 | B2 | 8/2004 | McDermott et al. |
| 6,845,447 | B1 | 1/2005 | Fujioka et al. |
| 7,035,404 | B2 * | 4/2006 | Furukawa ................... 380/28 |
| 7,117,368 | B2 * | 10/2006 | Sako ......................... 713/180 |
| 2001/0034640 | A1 | 10/2001 | Chaum |
| 2002/0077885 | A1 | 6/2002 | Karro et al. |
| 2002/0077887 | A1 | 6/2002 | Shrader et al. |
| 2002/0133396 | A1 | 9/2002 | Barnhart |
| 2003/0158775 | A1 | 8/2003 | Chaum |

FOREIGN PATENT DOCUMENTS

| | | |
|---|---|---|
| EP | 0 697 776 A2 | 2/1996 |
| EP | 0 743 620 A2 | 11/1996 |
| EP | 1 633 077 A2 | 3/2006 |
| JP | 08-263575 | 10/1996 |
| JP | 08-315053 | 11/1996 |
| JP | 10-257047 | 9/1998 |
| JP | 10-285157 | 10/1998 |
| JP | 11-338346 | 12/1999 |
| JP | 2001-217824 | 8/2001 |
| WO | WO92/03805 A1 | 3/1992 |
| WO | WO98/14921 | 4/1998 |
| WO | WO-01/20562 A2 | 3/2001 |
| WO | WO01/22200 A2 | 3/2001 |

OTHER PUBLICATIONS

Jakobsson, M. "Flash Mixing," Proceedings of the Eighteenth Annual ACM Symposium on Principles of Distributed Computing, Atlanta, Georgia, 1999, pp. 83-89, ACM Press, New York, NY, USA.

Jakobsson, M. "A Practical Mix," Advances in Cryptology—EUROCRYPT '98: International Conference on the Theory and Application of Cryptographic Techniques, pp. 448-461, vol. 1403, May/Jun. 1998, Espoo, Finland, Springer-Verlag GmbH, Germany.

Liu, Shengli et al., "A Voting Protocol Based on Elliptic Curve Cryptosystems," Journal of Electronics, Jan. 2000, pp. 84-89, vol. 22, No. 1 (English translation attached.).

Benaloh, J. et al., "Receipt-Free Secret-Ballot Elections," Proceedings of 26th ACM Symposium on Theory of computing, Montreal, May 1994, pp. 544-553.

Chaum, D., "Secret-Ballot Receipts: True Voter-Verifiable Elections," IEEE Computer Society, IEEE Security & Privacy, Jan.-Feb. 2004, vol. 2, No. 1, pp. 38-47.

Chaum, D., et al., "Wallet Databases with Observers," CRYPTO, 1992, vol. 740, Lecture Notes in Computer Science, pp. 89-105.

Cramer, R, et al., "A Secure and Optimally Efficient Multi-Authority Election Scheme", European Transactions on Telecommunications, Sep.-Oct., 1997, pp. 481-490, 8(5), EUREL Publications, 1997.

Koblitz, N., "Public Key," Chapter IV, A Course in Number Theory and Cryptograph, 2nd Edition, pp. 83-124, Springer-Verlag, 1994.

Naor, M., et al., "Visual Cryptograph," Eurocrypt 94, LNCS, Springer-Verlag, Berlin, 1995, vol. 950, pp. 1-12.

Neff, C.A., "A Verifiable Secret Shuffles and its Application to E-Voting," Eighth ACM Conference on Computer and Communications Security (CCS-8), Nov. 2001, pp. 116-125.

Benaloh, J., "Secret Sharing Homomorphisms: Keeping Shares of a Secret Secret", Advances in Cryptology—CRYPTO 1986, Lecture Notes in Computer Science, pp. 251-260, Springer-Verlag, Berlin, 1987.

Benaloh, J., et al., "Distributing the Power of a Government to Enhance the Privacy of Voters", ACM Symposium on Principles of Distributed Computing, pp. 52-62, 1986.

Borrell, Joan et al., "An implementable secure voting scheme", *Computers & Security*, Elsevier Science, Ltd., Great Britain, 1996, vol. 15, No. 4, pp. 327-338.

Chaum, D, "Elections with Unconditionally-Secret Ballots and Disruption Equivalent to Breaking RSA", EUROCRYPT 1988, pp. 177-182.

Chaum, D., "Untraceable Electronic Mail, Return Addresses, and Digital Pseudonyms", Communications of the ACM, 24(2):84-88, 1981.

Cramer, R, et al., "A Secure and Optimally Efficient Multi-Authority Election Scheme", Advances in Cryptology—EUROCRYPT 1997, Lecture Notes in Computer Science, Springer-Verlag, 1997.

Cramer, R., et al., "Multi-Authority, Secret-Ballot Elections with Linear Work", Advances in Cryptology—EUROCRYPT 1996, Lecture Notes in Computer Science, Springer-Verlag, Berlin, 1996.

Cramer, R., et al., Proofs of Partial Knowledge and Simplified Design of Cryptology—CRYPTO 1994, Lecture Notes in Computer Science, pp. 174-187, Springer-Verlag, Berlin, 1994.

Cranor, L. F., "Electronic Voting, Computerized polls may save money, protect privacy," Crossroads, The ACM's First Electronic Publication, May 6, 1999, 4 pages.

Cranor, Lorrie et al., "Sensus: A Security-Conscious Electronic Polling System for the Internet", Proceedings of the Hawaii International Conference on System Sciences, IEEE 1997, pp. 561-570.

Diffie, W., et al., "New Directions in Cryptography", IEEE Transactions on Information Theory, 22(6):644-654, 1976.

ElGamal, T., "A Public Key Cryptosystem and a Signature Scheme Based on Discrete Logarithms", IEEE Transactions on Information Theory, IT-31(4):469-472, 1985.

Fiat, A., et al., "How to Prove Yourself: Practical Solutions to Identification and Signature Problems", Advances in Cryptology—CRYPTO 1986, Lecture Notes in Computer Science, pp. 186-194, Springer-Verlag, New York, 1987.

Fujioka, A., et al., "A Practical Secret Voting Scheme for Large Scale Elections", Advances in Cryptology—.AUSCRYPT 1992, Lecture Notes in Computer Science, pp. 244-251, Springer-Verlag, 1992.

Gennaro, R., "Achieving independence efficiently and securely", Proceedings 14th ACM Symposium on Principles of Distributed Computing (PODC 1995), New York 1995.

Herschberg, M. A., "Secure Electronic Voting Over the World Wide Web," Massachusetts Institute of Technology, May 27, 1997, 81 pages.

Iversen, K., "A Cryptographic Scheme for Computerized General Elections", CRYPTO 1991, pp. 405-419.

Jan, Jin-Ke et al., "A Secure Electronic Voting Protocol with IC Cards", Elsevier Science Inc., New York, J. Systems Software 1997, 39:93-101.

Mu, Yi et al., "Anonymous Secure E-Voting over a Network", Proceedings, Annual Computer Security Applications Conference, IEEE 1998, pp. 293-299.

Odlyzko, A. M., "Discrete logarithms in finite fields and their cryptographic significance", Advances in Cryptology—EUROCRYPT 1984, Notes in Computer Science, Springer-Verlag, 1984.

Park, C., et al., "Efficient Anonymous Channel and All/Nothing Election Scheme", Advances in Cryptology—EUROCRYPT 1993, Lecture Notes in Computer Science, pp. 248-259, Springer-Verlag, 1993.

Pedersen, T., "A Threshold Cryptosystem without a Trusted Party", Advances in Cryptology—EUROCRYPT 1991, Lecture Notes in Computer Science, pp. 522-526, Springer-Verlag, 1991.

Sako, K., et al, Receipt-Free Mix-Type Voting Scheme—A practical solution to the implementation of a voting booth—, EUROCRYPT 1995, pp. 393-403.

Sako, K., et al., "Secure Voting Using Partially Compatible Homomorphisms", Advances in Cryptology—CRYPTO 1994, Lecture Notes in Computer Science, Springer-Verlag, 1994.

Schnorr, C.P., "Efficient Signature Generation by Smart Cards", Journal of Cryptology, 4(3):161-174, 1991.

Schoenmakers, B., "A Simple Publicly Verifiable Secret Sharing Scheme and its Application to Electronic Voting", Advances in Cryptology—CRYPTO 1999, Lecture Notes in Computer Science, pp. 1-17, Springer-Verlag 1999.

Shamir, A., "How to Share a Secret", Communications of the ACM, 22(11):612-613, 1979.

Schneier, Bruce, "Applied Cryptography, Second Edition," John Wiley & Sons, Inc., 1996, pp. 476-481, 490-491, and 532-533.

Davies, D. W., et al., "Security for Computer Networks," John Wiley & Sons, Ltd., Great Britain, 1984, pp. 253-257.

Jakobsson, M. et al., "Making Mix Nets Robust for Electronic Voting By Randomized Partial Checking," USENIX 2002, pp. 1-15.

Jules, A. et al., "Coercion-Resistant Electronic Elections," RSA Laboratories, Bedford, MA, 2005, pp. 1-21.

* cited by examiner

Fig. 1

Fig. 2

VERIFIABLE SECRET SHUFFLES AND THEIR APPLICATION TO ELECTRONIC VOTING

CROSS-REFERENCE TO RELATED APPLICATIONS

This application is a U.S. national phase application of PCT/US2002/009264 filed Mar. 25, 2002, which claims priority to: U.S. patent application Ser. No. 09/816,869 filed Mar. 24, 2001 (now U.S. Pat. No. 6,950,948); U.S. Provisional Patent Application Nos. 60/311,680 filed Aug. 9, 2001; 60/312,671 filed Aug. 15, 2001; and 60/313,003 filed Aug. 16, 2001, all of which are incorporated herein in their entireties by reference.

1 INTRODUCTION

The notion of a shuffle of a collection of objects, records, or tokens is simple and intuitive, and useful examples abound in various daily human activities. A gambler in a casino knows that among the cards in his hand, each will be one of 52 unique values, and that no one else at the table will have duplicates of the ones he holds. He does not, however, have any knowledge of how the cards are distributed, even though he may have recorded the exact card order before they were shuffled by the dealer.

In the context of electronic data, the problem of achieving the same kind of random, yet verifiable permutation of an input sequence is surprisingly difficult. The problem is that the data itself is either always visible to the auditor, or it isn't. If it is, then the correspondence between input records and output records is trivial to reconstruct by the auditor, or other observer. If it isn't, then input and output records must be different representations of the same underlying data. But if the output is different enough (that is, encrypted well enough) that the auditor cannot reconstruct the correspondence, then how can the auditor be sure that the shuffler did not change the underlying data in the process of shuffling?

Most of the paper is devoted to giving an efficient (linear) method for solving this problem in an important context—ElGamal, or Diffie-Hellman encrypted data. In order to make the exposition as clear and concise as possible, the majority of the paper explicitly refers to the specific case where the operations are carried out in a prime subgroup of $Z_p^*$, the multiplicative group of units modulo a large prime, p. However, the only properties of the underlying (multiplicative) group that we use is that the associated Diffie-Hellman problem is intractable. Thus, the shuffle protocol is also useful when the ElGamal cryptosystem is implemented over other groups such as elliptic curves.

The general Boolean proof techniques of [1] and [4] can also be used to construct a proof with the same properties, however, the resulting proof size (complexity) is quadratic, or worse, in the size of the input sequence.

The technique of this paper also offers several advantages over the cut-and-choose technique used in [8]. In this approach, the size of proof is dependent on the probability of a cheating prover that is required to satisfy all participants. In the shuffle protocol of this paper, this cheating probability is essentially k/q, where k is the number of elements to be shuffled, and q is the size of the subgroup of $Z_p^*$ in which the elements are encrypted. Although no analysis of the proof size dependence on cheating probability is done in [8], it appears that, in order to obtain similarly low cheating probability, it will need to be orders of magnitude larger than the size of the proof given in this paper. (Moreover, if the [8] protocol is implemented non-interactively, the cheating probability would need to be chosen exceedingly small, because a malicious participant might use considerable off-line computation to generate a forged proof by exhaustive search. This of course, could be the case with the protocol of this paper as well, but the probability k/q is, for all practical values of k and q, certainly small enough—even for offline attacks.)

The results of this paper provide for several ways to implement a universally verifiable election protocol. Some of these are presented in the final sections. In this context, it is worth comparing the elegant homomorphic election protocol of [2]. That protocol works well when ballots have only questions of a simple "choose (at most) m of n" type. This effectively precludes "write-in" responses, as well as "proportional type" questions where the voter is expected to indicate answers in preferential order, and questions are tabulated in accordance with this preference. (Theoretically, proportional type questions can be handled by mapping each valid permutation of selections to a single yes/no response. However, in practice this is infeasible unless the number of choices is quite small.) A couple of somewhat less important disadvantages of the [2] scheme are that it expands vote data size considerably, and that it requires a voter validity proof. This proof further expands the vote data size by about an order of magnitude, and is unattractive from a practical perspective, because it presumes special purpose code to be running on the voter's computer.

The shuffle protocols herein are constructed entirely from elementary arithmetic operations. They are thus simple to implement, and are imminently practical for the anonymous credential application described herein.

1.1 Applications to Voting

The voting application that occurs immediately is that which employs the usual tabulation/mixing center approach to provide anonymity. In this setting, the protocols of this paper offer important advantages. They are much more efficient, and allow the mixing centers to be completely independent of the authorities who hold some share of the key necessary to decrypt ballots.

Perhaps, however, a more valuable and exciting application of the new protocol is for creating "anonymous credentials". A member of an authorized group, identified only by a set of DSA, or Diffie-Hellman public keys, can authenticate group membership, and/or sign in a one time way, without revealing his/her individual identity. This leads to a novel solution to the voting problem that is universally verifiable, but does not require any special set of "authorities" in order to tabulate. It also offers a better privacy model to the voter, and speeds tabulation enormously since ballots do not need to be encrypted/decrypted. In effect, instead of mixing encrypted vote cyphertexts after ballots have been received at the vote collection center, voter credentials are mixed before the start of the election. This mixing can naturally be done by the voters themselves to achieve "anonymous authentication". (See section 7.1.) (It should be noted that the mixing could also be done by a set of authorities, thus providing a more efficient means to implement a threshold privacy election. One where, again, ballots do not need to be encrypted/decrypted.)

2 NOTATION

In the following, unless explicitly stated otherwise, n will be a positive integer, p and q will be prime integers, publicly known. Arithmetic operations are performed in the modular ring $Z_p$ (or occasionally $Z_n$), and $g \in Z_p$ will have (prime) multiplicative order q. (So, trivially, $q|(p-1)$.) In each proof protocol, P will be the prover (shuffler) and V the verifier (auditor).

We recall the Chaum-Pedersen proof of equality for discrete logarithms. For G, X, H, Y $\in Z_p$ this is a proof of knowledge for the relation $$\log_G X = \log_H Y \qquad (1)$$

It is not known to be zero-knowledge, however it is known to be honest-verifier zeroknowledge. In the next section, we will give a natural multi-variable generalization of this protocol which also has these properties. These are sufficient for our main application where the verifier is implemented via the Fiat-Shamir heuristic. (See [5] and [2].)

Definition 1 An instance of this proof, as above, will be denoted by

CP (G, X, H, Y).

Definition 2 For fixed $g \in Z_p^*$, let $\textcircled{x}_g$ be the binary operator on $\langle g \rangle \times \langle g \rangle$ defined by $$\log_g(x \textcircled{x}_g y) = \log_g x \log_g y$$

for all x, $y \in \langle g \rangle$. Alternatively $$g^a \textcircled{x}_g g^b = g^{ab} = (g^a)^b = (g^b)^a$$

for all a, $b \in Z_q$. Following the conventions used for summations and multiplications, we also use the notation $$\bigotimes_{i=1}^{k} {}_g X_i = X_0 \otimes_g X_1 \otimes_g \cdots \otimes_g X_k$$

We refer to this operation as logarithmic multiplication base, g.

In each of the notations in the preceding definition, the subscript g may be omitted when its value is clear from context.

Remark 1 Notice that $$\log_G X = \log_H Y \Longleftrightarrow G \textcircled{x}_g Y = H \textcircled{x}_g X \qquad (2)$$

We note the following collection of well know results, since they will be heavily used in the remainder of the paper.

Lemma 1 Let $f(x) \in Z_q[x]$, be a polynomial of degree d. Then there are at most d values $z_1, \ldots, z_d \in Z_q$ such that $f(z_i) = 0$.

Corollary 1 Let f(x), $g(x) \in Z_q[x]$ be two monic polynomials of degree at most d, with $f \neq g$. Then there are at most d–1 values $z_1, \ldots, z_{d-1} \in Z_q$ such that $f(z_i) = g(z_i)$.

Corollary 2 Let f(x), $g(x) \in Z_q[x]$ be two monic polynomials of degree at most d, with $f \neq g$. If $t \in_R Z_q$ (t is selected at random from $Z_q$), then $$P(\{t : f(t) = g(t)\}) \leq \frac{d-1}{q}$$

Corollary 3 Let f(x), $g(x) \in Z_q[x]$ be any two polynomials of degree at most d. Then for every constant $R \neq 0$, there are at most d values, $z_1(R), \ldots, z_d(R)$, such that $f(z_i(R)) = Rg(z_i(R))$.

Definition 3 Let f(x) be a polynomial in $Z_q[x]$. We denote by $X_f$ the (unordered) set of all roots of f.

$$X_f \doteq \{t \in Z_q : f(t) = 0\} \qquad (3)$$

Definition 4 If $\Lambda \subset Z_q$, and $R \in Z_q$, we write $$R\Lambda \doteq \{t \in Z_q : t = Ru, u \in \Lambda\} \qquad (4)$$

Corollary 4 Let f(x), $g(x) \in Z_q[x]$ be any two polynomials of degree at most d. Fix constants, $R \neq 0$, $\gamma \neq 0$, and $\delta \neq 0$. If $t \in_R Z_q$, then $$P(\{t : f(\gamma t) = Rg(\delta t)\}) \leq \frac{d}{q}$$

Lemma 2 Let $Z_q^k$ be the standard k-dimensional vector space over $Z_q$, and fix $v = (v_1, \ldots, v_k) \in Z_q^k$, $v \neq 0$, and $a \in Z_q$. If $r \in_R Z_q^k$ is chosen at random, then $$P(\{r : v \cdot r = a\}) = \frac{1}{q}$$

3 PROOFS FOR ITERATED LOGARITHMIC MULTIPLICATION

For the rest of this section, all logarithmic multiplications will be computed relative to a fixed element g, and hence we will omit the subscript in notation. The following problem is fundamental to the shuffle protocols which are to come later.

Iterated Logarithmic Multiplication Problem: Two sequences $\{X_i\}_{i=1}^k$ and $\{Y_i\}_{i=1}^k$ are publicly known. The prover, P, also knows $u_i = \log_g X_i$ and $v_i = \log_g Y_i$ for all i, but these are unknown to the verifier, V. P is required to convince V of the relation $$\bigotimes_{i=1}^{k} X_i = \bigotimes_{i=1}^{k} Y_i \qquad (5)$$

without revealing any information about the secret logarithms $v_i$ and $v_i$.

The protocol we give is precisely a higher dimensional generalization of the Chaum-Pedersen protocol discussed at the beginning of section 2. In fact, we will see that in the case k=2, the protocol is exactly the Chaum-Pedersen protocol. The presentation will be considerably simplified by restricting the problem instance to a case where $$X_i \neq 1, Y_i \neq 1 \quad \forall 1 \leq i \leq k \qquad (6)$$

Clearly, if any of these inequalities do not hold, then there is no sense in constructing a proof since equation (5) can be seen to hold or not by inspection. (If $X_i = 1$ then $x_i = 0$ and so equation (5) holds if and only if $Y_j = 1$ for some j. Similarly with the roles of X and Y reversed.)

Iterated Logarithmic Multiplication Proof Protocol (ILMPP):

1. P secretly generates, randomly and independently from $Z_q$, k–1 elements, $\theta_1, \ldots \theta_{k-1}$. P then computes $$A_1 = Y_1^{\theta_1} \qquad (7)$$

$$A_2 = X_2^{\theta_1} Y_2^{\theta_2}$$

$$\vdots = \vdots$$

-continued $$A_i = X_i^{\theta_{i-1}} Y_i^{\theta_i}$$
$$\vdots = \vdots$$
$$A_k = X_k^{\theta_{k-1}}$$

and reveals to V the sequence $A_1, \ldots, A_k$.

2. V generates a random challenge, $\gamma \in Z_q$ and reveals it to P.

3. P computes $k-1$ elements, $r_1, \ldots, r_{k-1}$, of $Z_q$ satisfying $$Y_1^{r_1} = A_1 X_1^{-\gamma} \quad (8)$$
$$X_2^{r_1} Y_2^{r_2} = A_2$$
$$\vdots = \vdots$$
$$X_i^{r_{i-1}} Y_i^{r_i} = A_i$$
$$\vdots = \vdots$$
$$X_k^{r_{k-1}} = A_k Y_k^{(-1)^{(k-1)} \gamma}$$

and reveals the sequence $r_1, \ldots, r_{k-1}$ to V. (We will see in the proof of completeness, below, how these values are computed.)

4. V accepts the proof if and only if all of the equations in (8) hold.

Theorem 1 The ILMPP is a three-move, public coin proof of knowledge for the relationship in equation (5) which is special honest-verifier zeroknowledge. The number of exponentiations required to construct the proof is k, and the number of exponentiations required to verify it is 2 k. If V generates challenges randomly, the probability of a forged proof is $1/q$.

Remark 2 Note that in constructing the proof, all exponentiations can be done to the same base, g, so fixed base algorithms can be employed. (See [6], p. 623.)

Proof: The protocol is clearly three-move and public coin. The exponentiation count in the construction of the proof looks like it should be $2k-2$, but actually it can be constructed with only k exponentiations. This is because P knows the logarithms $x_i$ and $y_i$, and hence can compute $A_i$ as $A_i = g^{\theta_{i-1} x_i + \theta_i y_i}$ for all $2 \leq i \leq k-1$.

Completeness

Completeness means that, given arbitrary $\vec{\theta} = (\theta_1, \ldots, \theta_{k-1})$ and $\gamma$, P can always find $\vec{r} = (r_1, \ldots, r_{k-1})$ satisfying the system of equations in (8). To see that this is the case, take $\log_g$ of each side of the equations in (8), and set $\bar{r}_i = r_i - \theta_i$ for $1 \leq i \leq k-1$. One obtains the following $k \times (k-1)$ system of linear equations in $Z_q$ for $\vec{r}_1, \ldots, \vec{r}_{k-1}$ $$\begin{pmatrix} y_1 & 0 & 0 & 0 & \cdots & 0 \\ x_2 & y_2 & 0 & 0 & \cdots & 0 \\ 0 & x_3 & y_3 & 0 & \cdots & 0 \\ \vdots & \vdots & \vdots & \vdots & \cdots & \vdots \\ 0 & 0 & \cdots & 0 & x_{k-1} & y_{k-1} \\ 0 & 0 & \cdots & 0 & 0 & x_k \end{pmatrix} \begin{pmatrix} \bar{r}_1 \\ \bar{r}_2 \\ \bar{r}_3 \\ \vdots \\ \bar{r}_{k-2} \\ \bar{r}_{k-1} \end{pmatrix} = \begin{pmatrix} -\gamma x_1 \\ 0 \\ 0 \\ \vdots \\ 0 \\ (-1)^{(k-1)} \gamma y_k \end{pmatrix} \quad (9)$$

The $(k-1) \times (k-1)$ subsystem $$\begin{pmatrix} x_2 & y_2 & 0 & 0 & \cdots & 0 \\ 0 & x_3 & y_3 & 0 & \cdots & 0 \\ \vdots & \vdots & \vdots & \vdots & \cdots & \vdots \\ 0 & 0 & \cdots & 0 & x_{k-1} & y_{k-1} \\ 0 & 0 & \cdots & 0 & 0 & x_k \end{pmatrix} \begin{pmatrix} \bar{r}_1 \\ \bar{r}_2 \\ \vdots \\ \bar{r}_{k-2} \\ \bar{r}_{k-1} \end{pmatrix} = \begin{pmatrix} 0 \\ 0 \\ \vdots \\ 0 \\ \gamma y_k \end{pmatrix} \quad (10)$$

is non-singular since its determinant is $$\prod_{i=2}^{k} x_i,$$

which is non-zero by assumption (6). Hence, one can always solve it for $\vec{r}_1, \ldots, \vec{r}_{k-1}$. In fact, the solution is $$\bar{r}_i = (-1)^{(k-i-1)} \gamma \prod_{j=i+1}^{k} \left( \frac{y_j}{x_j} \right) \quad (11)$$

However, under the hypotheses of the problem, (10) actually implies (9). This is because $$0 = \prod_{i=1}^{k} x_i - \prod_{i=1}^{k} y_i = \begin{vmatrix} x_1 & y_1 & 0 & 0 & 0 & \cdots & 0 \\ 0 & x_2 & y_2 & 0 & 0 & \cdots & 0 \\ 0 & 0 & x_3 & y_3 & 0 & \cdots & 0 \\ \vdots & \vdots & \vdots & \vdots & \vdots & \cdots & \vdots \\ 0 & 0 & 0 & \cdots & 0 & x_{k-1} & y_{k-1} \\ (-1)^k y_k & 0 & 0 & \cdots & 0 & 0 & x_k \end{vmatrix} \quad (12)$$

which, combined with the fact that the sub-matrix on the left of equation (10) is non-singular, means that the first column vector of the $k \times k$ matrix in (12) must be a linear combination of the remaining $k-1$ column vectors.

Soundness

If the first column vector of the matrix on the left of equation (12) is not a linear combination of the remaining $k-1$ column vectors, then there can be at most one value of $\gamma \in Z_q$ for which equation (9) holds. Thus, if $\gamma$ is chosen randomly, there is at most a chance of 1 in q that P can produce $r_1, \ldots, r_{k-1}$ which convince V.

Special Honest-Verifier Zeroknowledge

Honest-verifier zero-knowledge holds because, for random $\gamma$ and random $\vec{r} = (r_1, \ldots, r_{k-1})$, and for $$\vec{A} = \begin{pmatrix} A_1 \\ A_2 \\ \vdots \\ A_{k-1} \\ A_k \end{pmatrix} = \begin{pmatrix} X_1^\gamma Y_1^{r_1} \\ X_2^{r_1} Y_2^{r_2} \\ \vdots \\ X_{k-1}^{r_{k-2}} Y_{k-1}^{r_{k-1}} \\ X_k^{r_{k-1}} Y_k^{(-1)^{k} \gamma} \end{pmatrix} \quad (13)$$

the triple $(\vec{A}, \gamma, \vec{r})$ is an accepting conversation. Hence, a simulation is constructed by generating random and independent $\gamma$ and $r_i$, and setting $\vec{A}$ as in equation (13).

It is easy to see that the distribution so generated for $\vec{A}$ is identical to that generated according to (7), again because the first column vector of the matrix in (12) is a fixed linear combination of the remaining column vectors. So if V is honest, the simulation is perfect. Since the challenge, $\gamma$, can be chosen freely, we also have special honest-verifier zero-knowledge.

Remark 3 The solutions for $\vec{r}_i$ in (11) could also be written formally as $$\bar{r}_i = (-1)^{(i-1)} \gamma \prod_{j=1}^{i} \left(\frac{x_j}{y_j}\right)$$

However, this will not work if some of the $y_j$ are 0. In the case of equation (11), this problem was avoided by assumption (6). Of course, the main part of the solution could just have well been set up under the assumption that $y_i \neq 0$ for all $1 \leq i \leq k-1$—the choice of expression for $r_i$ just needs to be kept consistent with the form of the assumption.

Remark 4 We leave it to the reader to check that in the case k=2, the ILMPP reduces exactly to the well known Chaum-Pedersen protocol. In so doing, it is worth recalling remark 1, equation (2).

Remark 5 Special Soundness

As is the case with the Chaum-Pedersen protocol, which proves that P knows $s = \log_g X = \log_H Y$, the ILMPP proves that P knows $s_1, \ldots, s_k$ such that $\log_g X_i = \log_g Y_i$, and $\Pi_{i=1}^{k} s_i = 1$. This is clear because from two accepting conversations, $(\vec{A}, \gamma, \vec{r})$ and $(\vec{A}, \gamma', \vec{r}')$, with the same first move and $\gamma \neq \gamma'$, a witness, $$(w, \rho) = (\gamma - \gamma', \vec{r} - \vec{r}')$$

can be extracted satisfying $$Y_1^{\rho_1} = X_1^{-\omega} \quad (14)$$
$$Y_2^{\rho_2} = X_2^{-\rho_1}$$
$$\vdots = \vdots$$
$$Y_i^{\rho_i} = X_i^{-\rho_{i-1}}$$
$$\vdots = \vdots$$
$$Y_k^{(-1)^k \omega} = X_k^{-\rho_{k-1}}$$

Since $w = \gamma - \gamma' \neq 0$, it follows that $\rho_i \neq 0$ for all $1 \leq i \leq k-1$. Thus, with an appropriate small modification to the statement of the problem, it satisfies special soundness.

4 THE SIMPLE K-SHUFFLE

The first shuffle proof protocol we construct requires a restrictive set of conditions. It will be useful for two reasons. First, it is a basic building block of the more general shuffle proof protocol to come later. Fortuitously, it also serves a second important purpose. A single instance of this proof can be constructed to essentially "commit" a particular permutation. This can be important when shuffles need to be performed on tuples of $Z_p$ elements, which is exactly what is required when shuffling ElGamal pairs, as in the voting application.

Definition 5 Suppose two sequences of k elements of $Z_p$, $X_1, \ldots, X_k$, and $Y_1, \ldots, Y_k$, along with two additional elements, C and D, are publicly known. Suppose also, that the prover, P, knows $x_{i=\log g} X_i$, $y_i = \log_g Y_i$, $c = \log_g C$, and $d = \log_g D$, but that all these values are unknown to the verifier, V. P is required to convince V that there is some permutation, $\pi \in \Sigma_k$, with the property that $$Y_i^d = X_{\pi(i)}^c \quad (15)$$

for all $1 \leq i \leq k$ without revealing any information about $x_i$, $y_i$, $\pi$, c, or d. We call this problem the Simple k-Shuffle Problem.

Remark 6 For this section, and the remainder of the paper, we will make the simplifying assumptions that in all shuffle constructions
1. $x_i \neq x_j$ for $i \neq j$ (and hence, of course, $y_i \neq y_j$ for $i \neq j$).
2. $x_i \neq 1$ for all $1 \leq i \leq k$.

There are obvious ways to handle these special cases. Moreover, in practice, they will "essentially never" occur since elements are usually random.

The protocol of the previous section, in combination with corollary 2, provide the tools necessary to solve this problem in a fairly straightforward manner.

Simple k-Shuffle Proof Protocol:
1. V generates a random $t \in Z_q$ and gives it to P as a challenge.
2. P and V publicly compute $U = D^t = g^{dt}$, $W = C^t = g^{ct}$, $$\vec{\hat{X}} = (\hat{X}_1, \ldots, \hat{X}_k) = (X_1/U, \ldots, X_k/U)$$

and $$\vec{\hat{Y}} = (\hat{Y}_1, \ldots, \hat{Y}_k) = (Y_1/W, \ldots, Y_k/W)$$

3. P and V execute the ILMPP for the two length 2 k vectors $$\Phi = \left(\vec{\hat{X}}, \overbrace{C, C, \ldots, C}^{k}\right) \quad (16)$$

$$\Psi = \left(\vec{\hat{Y}}, \overbrace{D, D, \ldots, D}^{k}\right)$$

The protocol succeeds (V accepts the proof) if and only if V accepts this ILMPP.

Theorem 2 The Simple k-Shuffle Proof Protocol is a four-move, public coin proof of knowledge for the relationship in equation (15). It satisfies special soundness, and is special honest-verifier zeroknowledge. The number of exponentiations required to construct the proof is 2 k, and the number of exponentiations required to verify it is 4 k. If V generates challenges randomly, the probability of a forged proof is less than or equal to $$(k-1)/q + (q-k+1)/q^2 = (qk-q+q-k+1)/q^2 < k/q$$

Remark 7 The observations of remark 2 also apply in this case.

Proof: All of the required properties follow immediately from the results of the previous section. (Special soundness can be argued from remark 5.) A forged proof can only be generated in two conditions.

1. The challenge t is one of the special values for which $$\prod_{i=1}^{k}(t-x_i/d) = \prod_{i=1}^{k}(t-y_i/c)$$

2. The challenge t is not one of the special values in 1 above, and the ILMPP is forged. By corollary 2, the probability of 1 is at most $(k-1)/q$, and the probability of 2 is $(q-k+1)/q^2$ by the results of the previous section.

4.1 A Complexity Improvement

Both the size and complexity of the simple k-shuffle protocol can be improved by a factor of 2. Instead of using corollary 2, we use corollary 4. Intuitively, we would like to replace the k copies of D and k copies of C in equation (16) with single entries $g^{d^k}$ and $g^{c^k}$ respectively. Unfortunately, this would ruin the zeroknowledge property of the protocol. Instead, we modify the protocol as follows.

Simple k-Shuffle Proof Protocol II:

1. P generates randomly and independently $\beta$ from $Z_q$ and r from $Z_q-\{0\}$, computes $$B=g^\beta$$
$$T=g^r \qquad (17)$$

and reveals B and T to V.

2. V generates a random $\lambda$ from $Z_q$ and reveals it to P.
3. P computes s by $$s = \beta + \lambda_T - \prod_{i=1}^{k}\left(\frac{x_i}{y_i}\right) = \beta + \lambda_T - \left(\frac{d}{c}\right)^k \qquad (18)$$

and reveals s to V.

4. V generates a random $t \in Z_q$ and gives it to P as a challenge.
5. P and V publicly compute $U=D^t=g^{dt}$, $W=C^t=g^{ct}$, $$\vec{X} = (\hat{X}_1, \ldots, \hat{X}_k) = (X_1/U, \ldots, X_k/U)$$

and $$\vec{Y} = (\hat{Y}_1, \ldots, \hat{Y}_k) = (Y_1/W, \ldots, Y_k/W)$$

6. P secretly generates, randomly and independently from $Z_q$, k elements, $\theta_1, \ldots \theta_k$. P then computes $$A_1 = \hat{Y}_1^{\theta_1} \qquad (19)$$
$$A_2 = \hat{X}_2^{\theta_1}\hat{Y}_2^{\theta_2}$$
$$\vdots = \vdots$$
$$A_i = \hat{X}_i^{\theta_{i-1}}\hat{Y}_i^{\theta_i}$$
$$\vdots = \vdots$$
$$A_k = \hat{X}_k^{\theta_{k-1}}\hat{Y}_k^{\theta_k}$$
$$A_{k+1} = g^{\theta_k}$$

and reveals to V the sequence $A_1 \ldots, A_{k+1}$.

7. V generates a random challenge, $\gamma \in Z_q$ and reveals it to P.
8. P computes k elements, $r_1, \ldots, r_k$, of $Z_q$ satisfying $$\hat{Y}_1^{r_1} = A_1\hat{X}_1^{-\gamma} \qquad (20)$$
$$\hat{X}_2^{r_1}\hat{Y}_2^{r_2} = A_2$$
$$\vdots = \vdots$$
$$\hat{X}_i^{r_{i-1}}\hat{Y}_i^{r_i} = A_i$$
$$\vdots = \vdots$$
$$\hat{X}_k^{r_{k-1}}\hat{Y}_k^{r_k} = A_k$$
$$g^{r_k} = A_{k+1}(BT^\lambda g^{-s})^{(-1)^{k}\gamma}$$

and reveals the sequence $r_1, \ldots, r_k$ to V.

9. V accepts the proof if and only if all of the equations in (20) hold.

Theorem 3 Simple k-Shuffle Proof Protocol II is a five-move, public coin proof of knowledge for the relationship in equation (15). It satisfies special soundness, and is special honest-verifier zeroknowledge. The number of exponentiations required to construct the proof is k+4, and the number of exponentiations required to verify it is 2k+2.

If V generates challenges randomly, the probability of a forged proof remains less than or equal to $$(k-1)/q+(q-k+1)/q^2=(qk-q+q-k+1)/q^2<k/q$$

Proof Sketch: All of the arguments are very similar, property by property, to the arguments constructed in the case of the original protocol. The main difference is that one makes all appeal to corollary 4 rather than corollary 2.

Definition 6 We denote an instance of the Simple k-Shuffle Protocol II by $SS_k(\vec{X}, \vec{Y}, C, D)$, where $\vec{X}=(X_1, \ldots, X_k)$, $\vec{Y}=(Y_1, \ldots, Y_k)$, C, and D are as in definition 5.

5 THE GENERAL k-SHUFFLE

An obvious limitation of the simple k-Shuffle protocol is that the shuffler, P, must know all the original exponents $x_1, \ldots, x_k$ and $y_1 \ldots y_k$. In many applications, this will not be the case. The goal of this section is to eliminate that restriction.

General k-Shuffle Problem: Two sequences of k elements of $Z_p$, $X_1, \ldots, X_k$, and $Y_1, \ldots, Y_k$ are publicly known. In addition, constants $c, d \in Z_q$ are known only to P, but commitments $C=g^c$ and $D=g^d$ are made public. P is required to convince V that there is some permutation, $\pi \in \Sigma_k$, with the property that $$Y_i^d = X_{\pi(i)}^c \qquad (21)$$

for all $1 \leq i \leq k$ without revealing any information about $\pi$, c, or d.

General k-Shuffle Proof Protocol:

(For the sake of presentation, we consider the case d=1. The general case can be reduced to this case simply by changing the group generator from g to C, and making the substitution c=c/d.)

1. For $1 \leq i \leq k$, P generates $a_i$, $b_i$, $v_i$, and $w_i$ randomly and independently from $Z_q$, and computes $$A_i=g^{a_i}$$
$$B_i=g^{b_i}$$

$U_i = g^{u_i}$ $W_i = g^{w_i}$ (22)

In addition, P generates $\gamma$ from $Z_q - \{0\}$, and also $z_0$, $z_1$ randomly and independently from $Z_q$, and computes $\Gamma = g^\gamma$ $Z_0 = g^{z_0}$ $Z_1 = g^{z_1}$ (23)

and, for $1 \leq i \leq k$:

$C_i = A_{\pi(i)}{}^\gamma = g^{\gamma a_{\pi(i)}}$ (24)

and finally $$\Lambda = \frac{\prod_{i=1}^{k} Y_i^{\omega_i}}{K_1^c K_0^{\gamma c} \prod_{i=1}^{k} X_i^{\gamma c u_i}}$$ (25)

$$= g^{-(cz_1 + \gamma c z_1)} \prod_{i=1}^{k} X_i^{\gamma c u_i - c\omega_{\pi^{-1}(i)}}$$

P then reveals the ordered sequences $A_i$, $B_i$, $C_i$, $U_i$, and $W_i$ along with $X_0$, $Y_0$, and $\Lambda$ to V.

2. For $1 \leq i \leq k$, V chooses $e_i$ randomly and independently from $Z_q - \{0\}$ and returns the sequence to P.

3. P computes $D_i = g^{\gamma e_{\pi(i)} b_{\pi(i)}}$ (26)

for $1 \leq i \leq k$ and reveals these to V.

4. V generates $t \in Z_q - \{0\}$ and returns it to P as a challenge.

5. For $1 \leq i \leq k$, P secretly computes the exponents $r_i = a_i + t e_i b_i$ $s_i = \gamma r_{\pi(i)}$ (27)

6. P and V then execute the simple k-shuffle, $SS_k(\vec{R}, \vec{S}, g, \Gamma)$, where $\vec{R} = (R_1, \ldots, R_k) = (g^{r_1}, \ldots, g^{r_k})$ $\vec{S} = (S_1, \ldots, S_k) = (g^{s_1}, \ldots, g^{s_k})$ (28)

(Note that P need not explicitly compute $R_i$ and $S_i$ in order to construct the proof, while V can compute $R_i$ and $S_i$ as $R_i = A_i B_i t e^i$ and $S_i = C_i D_i^t$. Thus, this proof protocol requires P to compute $k+4$ exponentiations, and V to compute $4k+2$ exponentiations.)

7. P reveals the exponents $\rho_i = v_i + r_i - a_i$ $\sigma_i = w_i + s_i - c_i$ (29)

8. V checks that $g^{\rho_i} = U_i R_i / A_i$ $g^{\sigma_i} = W_i S_i / C_i$ (30)

and evaluates $$G = Z_0 \prod_{i=1}^{k} X_i^{\rho_i}$$ (31)

$$H = \prod_{i=1}^{k} Y_i^{\sigma_i}$$

9. P computes $G_0 = G^\gamma$ $G_1 = (Z_1 G_0)^c$ (32)

and executes with V the two Chaum-Pedersen proofs, CP $(g, \Gamma, G, G_0)$ and CP $(g, C, Z_1 G_0, G_1)$ (Thus proving to V that equations 32 hold.)

10. V finally checks that $$\frac{H}{G_1} = \Lambda$$ (33)

11. V accepts the proof if and only if
   (a) All equations that must be checked (steps 8 and 10) are satisfied
   (b) V accepts the simple shuffle proof of step 6
   (c) V accepts both Chaum-Pedersen proofs in step 9

6 THE MULTI-AUTHORITY VOTING APPLICATION

Much of the setting for the conventional voting application can be found in [2]. Votes are submitted as ElGamal pairs of the form $(g^{\alpha_i}, h^{\alpha_i} m)$ (or a sequence of these pairs if more data is required), where m is some standard encoding of the voter choices, the $\alpha_i$ are generated secretly by the voters, and h is a public parameter constructed via a dealerless secret sharing scheme ([7]). Once the polls are closed (voting finished), an independent collection of authorities sequentially shuffles the ballots. Each shuffle is constructed as $(\vec{X}_i, \vec{Y}_i) = (g^{\beta_{\pi(i)}} X_{\pi(i)}, h^{\beta_{\pi(i)}} Y_{\pi(i)})$ (34)

where the $r_i$ are randomly chosen from $Z_q$ and $(X_i, Y_i) = (g^{\alpha_i}, h^{\alpha_i} M_i)$ On output of the final shuffle, the final collection of encrypted ballots is decrypted in accordance with the threshold scheme, and the clear text votes are tabulated in full view by normal election rules.

The authorities who participate in the sequential shuffles, may be arbitrary in number, and they may be completely different from those who hold shares of the election private key. The sequence of ballots which are finally decrypted can only be matched with the original sequence of submitted ballots if all of the shuffling authorities collude, since each of their permutations is completely arbitrary.

Although the form of each shuffle is different from the shuffle discussed in section 5, a proof protocol can be constructed with minor modifications. We present the details in the following subsection.

6.1 Shuffles of ElGamal Pairs

1. For $1 \leq i \leq k$, P generates $a_i$, $b_i$, $u_i$ and $w_i$ randomly and independently from $Z_q$, and computes $A_i = g^{a_i}$ $B_i = g^{b_i}$ $U_i = g^{u_i}$ $W_i = g^{w_i}$ (35)

In addition, P generates γ from $Z_q - \{0\}$, and also $x_0$, $y_0$ and $t_0$ randomly and independently from $Z_q$, and computes $\Gamma = g^\gamma$ $X_0 = g^{x_0}$ $Y_0 = g^{y_0}$ (36)

and, for $1 \leq i \leq k$ $C_i = A_{\pi(i)}^\gamma = g^{\gamma a_{\pi(i)}}$ (37)

and finally $$\Lambda = \frac{g^{t_0} X_0^\gamma \prod_{i=1}^{k} (\overline{Y}_i^{w_i} / Y_i^{\gamma u_i})}{h^{t_0} Y_0^\gamma \prod_{i=1}^{k} (\overline{X}_i^{w_i} / X_i^{\gamma u_i})}$$

$$= g^{\gamma(x_0 - y_0)} \left(\frac{g}{h}\right)^{t_0 - \sum_{i=1}^{k} w_i \beta_{\pi(i)}} \prod_{i=1}^{k} \left(\frac{X_i}{Y_i}\right)^{\gamma u_i - w_{\pi^{-1}(i)}}$$ (38)

P then reveals the ordered sequences $A_i$, $B_i$, $C_i$, $U_i$, and $W_i$ along with $X_0$, $Y_0$, and $\Lambda$ to V.

2. For $1 \leq i \leq k$, V chooses $e_i$ randomly and independently from $Z_q - \{0\}$ and returns the sequence to P.

3. P computes $D_i = g^{\gamma e_{\pi(i)} b_{\pi(i)}}$ (39)

for $1 \leq i \leq k$ and reveals these to V.

4. V generates $c \in Z_q - \{0\}$ and returns it to P as a challenge.

5. For $1 \leq i \leq k$, P secretly computes the exponents $r_i = a_i + c e_i b_i$ $s_i = \gamma r_{\pi(i)}$ (40)

6. P and V then execute the simple k-shuffle, $SS_k (\vec{R}, \vec{S}, g, \Gamma)$, where $\vec{R} = (R_1, \ldots, R_k) = (g^{r_1}, \ldots, g^{r_k})$ $\vec{S} = (S_1, \ldots, S_k) = (g^{s_1}, \ldots, g^{s_k})$ (41)

(Note that P need not explicitly compute $R_i$ and $S_i$ in order to construct the proof, while V can compute $R_i$ and $S_i$ as $R_i = A_i B_i c e^i$ and $S_i = C_i D_i c$. Thus, this proof protocol requires P to compute k+4 exponentiations, and V to compute 4k+2 exponentiations.)

7. P reveals the exponents $\rho_i = u_i + r_i - a_i$ $\sigma_i = w_i + s_i - c_i$ (42)

8. V checks that $g^{\rho_i} = U_i R_i A_i$ $g^{\sigma_i} = W_i S_i C_i$ (43)

and evaluates $$G = X_0 \prod_{i=1}^{k} X_i^{\rho_i}$$ (44)

$$H = Y_0 \prod_{i=1}^{k} Y_i^{\rho_i}$$

$$\overline{G} = \prod_{i=1}^{k} \overline{X}_i^{\sigma_i}$$

$$\overline{H} = \prod_{i=1}^{k} \overline{Y}_i^{\sigma_i}$$

9. P computes $G_0 = G^\gamma$ $H_0 = H^\gamma$ (45)

and executes with V the two Chaum-Pedersen proofs, CP (g, Γ, G, $G_0$) and CP (g, Γ, H, $H_0$). (Thus proving to V that equations 45 hold.)

10. P and V compute $\Delta_0 = \overline{G}/G_0$ $\Delta_1 = \overline{H}/H_0$ (46)

11. P computes $$t = t_0 + \sum_{i=1}^{k} \gamma c\, e_i b_i \beta_i$$ (47)

and reveals it to V.

12. V finally checks that $$\frac{\Delta_1 / h^t}{\Delta_0 / g^t} = \Lambda$$ (48)

13. V accepts the proof if and only if
   (a) All equations that must be checked (steps 8 and 12) are satisfied
   (b) V accepts the simple shuffle proof of step 6
   (c) V accepts both Chaum-Pedersen proofs in step 9

6.2 One Pass Tabulation

In the standard mix-net implementation, it is assumed that two distinct phases must take place:

Shuffling (or mixing) The set of encrypted ballots are mixed. This means that the entire encrypted (and iteratively shuffled) ballot box must be passed sequentially from one authority to another until a sufficient number of mixing stages have been performed. More precisely, let $A_1, \ldots, A_n$ be the sequence of shuffling, or mixing entities, usually called authorities. Let B be a sequence of encrypted ballots. Sequentially, each $A_i$ performs the following operations.

1. $A_i$ receives $B = ((X_1, Y_1), \ldots, (X_k, Y_k))$ from $A_{i-1}$, along with all required authentication and validity proofs. (In the case i=1, $A_1$ receives B directly from the vote collection center.)

2. $A_i$ performs all necessary authentication checks and validity (proof) verifications.
3. If any of the checks in the step 2 fail, tabulation is aborted, or possibly restarted. Otherwise, $A_i$ computes $$\vec{B}=((\vec{X}_1,\vec{Y}_1),\ldots,(\vec{X}_k,\vec{Y}_k))$$

according to equation 34, and also the corresponding validity proof, $P_i$, of section 6.1. (Typically, this is a non-interactive version of the protocol.)

4. Renaming $\vec{B}$ as B, $A_i$ sends B to $A_{i+1}$ along with $P_i$ and any other required authentication or validity checks. In the case i=n, the mixing is terminated, and tabulation proceeds to the decryption phase.

Decryption After shuffling (mixing), the resulting set of ballots are all encrypted to the election public key, usually denoted by h. In order to decrypt these ballots, each authority must now contribute a decryption share. This is accomplished as follows.

1. Let $$B=((X_1,Y_1),\ldots,(X_k,Y_k))$$

be the set of encrypted ballots output by the final mixing authority, $A_n$, and let $S_D=\{D_1,\ldots,D_t\}$ be the subset of decryption authorities participating in the decryption. (The value t is determined by the threshold used when the election public key, h, was created. See [7].)

2. For each $1 \leq j \leq t$, and in parallel:
  (a) $D_j$ receives the sequence $X_1,\ldots,X_k$ along with proper authentication of its validity.
  (b) If a check of the authentication provided in step 2a fails, $D_j$ should abort the decryption. Otherwise, for each $1 \leq i \leq k$, $D_j$ computes $$Z_{ij}=X_i^{z(j,SD)s_j} \quad (49)$$

where $s_j$ is $D_j$'s decryption share, and $z(j, S_D)$ is a publically computable constant multiplier. (See [7].) $D_j$ also produces a Chaum-Pedersen proof of validity, $C_{ij}$, for equation 49.
  (c) V returns all $Z_{ij}$ and $C_{ij}$ to a tabulation center.

3. Assuming that all $C_{ij}$ received at the tabulation center are valid, the set of clear text ballots are computed as $$M_i = Y_i \bigg/ \prod_{j=1}^{t} Z_{ij} \quad (50)$$

4. The election tally is finally computed by counting the $M_i$ as in any election.

If the set, $S_D$, of decryption authorities (or even just some subset of it) is included in the set of shuffling authorities (this is almost always the case in practice), a disadvantage of this procedure is that it requires each authority that is in both sets to receive two separate communications, each of which may be quite large. The disadvantage is particularly severe when the authorities are connected by a slow communication link.

We observe that it is possible for some or all of the decryption to take place at the same time as mixing. This is accomplished simply by combining, during the shuffling phase, shuffling step 3 with decryption step 2 for each of those shuffling authorities who are members of $S_D$. Those shuffling authorities who are not members of $S_D$ can follow the steps unmodified.

So, if $A_j$ is a member of $S_D$, in shuffling step 4, rather than just send B to $A_{j+1}$, $A_j$ sends both $$B=((X_1,Y_1),\ldots,(X_k,Y_k))$$

and $$Z=((Z_{1j},C_{1j}),\ldots,(Z_{kj},C_{kj}))$$

where $Z_{ij}$ and $C_{ij}$ are as above. Further, instead of using B as the input to its shuffle, $A_{j+1}$ should use $$B=((X_1,Y_1/Z_{1j}),\ldots,(X_k,Y_k/Z_{kj}))$$

In this way, if all of the decryption authorities are also shuffle authorities, as is usually the case, then the final output will be a set of decrypted ballots, thus eliminating the need for a seperate decryption phase. If only $t_0<t$ decryption authorities are also shuffle authorities, then the final shuffled ballot box will consist of elements that are encrypted with a public key which is shared among the remaining $t-t_0$ decryption authorities. Thus, in this case there is still a need for a decryption phase, but the amount of communication required is reduced by the corresponding amount.

7 k-Shuffles of DSA Public Keys

The general k-shuffle is ideally suited to verifiably permuting a set of DSA, or Diffie-Hellman public keys. By this we mean that a new set of DSA public keys is produced, which is computationally unlinkable to the original set, but which verifiably represents the same set of private keys. This can be extremely valuable when one wishes to anonymize a set of authenticated keys while still protecting the integrity of the original group of private keys—the election setting is just one such example.

We only sketch the technique here, but the details should then be completely obvious to the reader. It is assumed that initially all the public keys are of the form (g,H), $H=g^s$, where g is some fixed generator and s is the private key. That is, loosely, "all the keys use the same base". The protocol proceeds as follows:

1. Shuffler, or mixer, is presented with g and the list of keys $H_i$.
2. Shuffler executes the general k-shuffle with C=g, and $Y_i=H_i'$ (the new public keys), implementing the verifier's random challenges via the Fiat-Shamir heuristic. (That is, a non-interactive version of the proof protocol is executed.)
3. Shuffler "returns" the entire proof transcript.
4. Assuming the transcript verifies, set g=C, and $H_i=H_i'$. By changing the common base to C, the private keys all remain the same since $$H=g^s \Longleftrightarrow H'=C^s \quad (51)$$

7.1 Anonymous Voters

In the voting application, it is often said that for election integrity one must know "who voted", but for privacy, one must not know "how voted". The technique of this section solves the privacy/integrity dilemma in a new way. Instead of knowing "who voted", one only knows that the person who voted is a member of a set of authorized voters! As a consequence, we are left with a voting solution that 1. Does not require key sharing to implement a distributed trust tabulation scheme.
2. Guarantees computational privacy to the voter, rather than threshold privacy, which is a necessary evil of other voting solutions based on distributed trust tabulation. (If a threshold number of authorities agree to collude, all voters' votes can be decrypted.)

3. Does not require encryption or decryption of voted ballots.

Of course, one must look after the problem of "double voting", but the technique of this section is easily modified to take care of that as follows.

AV-1. In step 3, the voter (shuffler)—who knows one of the private keys $s_0$ in this case—signs his voted ballot using a DSA signature scheme with group generator (or base), C, and key pair $(s_0, H_0')$. ($H_0'$ is the "post shuffle" public key which belongs to the voter. The voter knows its place in the new sequence, since he/she executed the shuffle. And, moreover, the properties of the shuffle guarantee that $H_0'=C^{s_0}$—that is, $s_o$ is the private key corresponding to $H_0'$.)

AV-2. In step 4, assuming that the shuffle transcript checks, and that the ballot signature checks, the vote center simply removes $H_0'$ from the list of authorized keys, and starts the process again waiting for the next ballot request. The new list of public keys is now one smaller, and unless the voter (shuffler) knew more than one private key in the first place, he/she now knows none of the new private keys, and hence can not vote again.

The resulting election protocol is Universally Verifiable if all the shuffle transcripts and signatures are maintained.

Although this election scheme offers superior privacy characteristics (the secrecy of each voter's ballot is protected by the voter, rather than by a distributed set of authorities), there is a potential practical drawback. The amount of computation required both of the voter (that is, the voter's computer) and the vote collection server computer for the purpose of authentication is much larger than in standard election protocols, where the voter must only compute a standard public key signature. However, if this additional computation is expected to cause a problem, then the same anonymization can be performed well in advance of the election, before the ballot is available.

This is accomplished by issuing standard PKI certificates issued in response to a certificate request which is anonymously signed exactly as the ballot is signed in step AV-1 above. Of course these certificate requests would contain no identifying personal information, but they would otherwise be completely standard, including, most importantly, a standard public key for which the voter has the corresponding private key. At vote time, the ballot can be simply signed with this ordinary private key. With this strategy, it is possible to re-use the anonymous certificates. Thus the computational cost of the anonymous signatures can be amortized over many elections.

8 k-Shuffles of Tuples

It should be clear that in section 5, the simple shuffle generated essentially "froze" the permutation that could be proved. This makes it easy to see how to extend the previous section to shuffles of k l-tuples of elements of <g>), or k l-tuples of ElGamal pairs. Thinking of a sequence of k l-tuples as a k×l array, a single simple k-shuffle can serve to prove that all columns have been permuted according to the same permutation. Precisely, this means that the same values of $A_i$, $B_i$, $C_i$ and $D_i$ in both the General k-Shuffle protocol, and the ElGamal Shuffle protocol are used for all columns. (In the General k-Shuffle, the same value of t can be used for all columns, while in the ElGamal Shuffle, the same value of c can be used for all columns, though this is not essential.)

8.1 DSA Key Shuffles without Common Base

The observation of this section also allows a generalization of the DSA key shuffle protocol of section 7. Rather than maintaining the entire set of public keys to the same base, $g \leftrightarrow C$, the keys are maintained as independent pairs $(g_i, H_i)$. The shuffler can pick an arbitrary subset of key pairs, $(G_i, H_i)$, shuffle them "as 2-tuples", and return the result. This makes shuffling more manageable if the original set is large, at the cost of increasing the work per key by about 50%.

REFERENCES

[1] R. Cramer, I. Damgrd, B. Schoenmakers. Proofs of partial knowledge and simplified design of witness hiding protocols. *Advances in Cryptology—CRYPTO '94*, Lecture Notes in Computer Science, pp. 174-187, Springer-Verlag, Berlin, 1994.

[2] R. Cramer, R. Gennaro, B. Schoenmakers. A secure and optimally efficient multi-authority election scheme. *Advances in Cryptology—EUROCRYPT '97*, Lecture Notes in Computer Science, Springer-Verlag, 1997.

[3] D. Chaum and T. P. Pedersen. Wallet databases with observers. Advances in Cryptology—CRYPTO '92, volume 740 of *Lecture Notes in Compute Science*, pages 89-105, Berlin, 1993. Springer-Verlag.

[4] A. De Santis, G. Di Crescenzo, G. Persiano and M. Yung. On Monotone Formula Closure of SZK. *FOCS 94*, pp. 454-465.

[5] A. Fiat, A. Shamir. How to prove yourself: Practical solutions to identification and signature problems. *Advances in Cryptology—CRYPTO '86*, Lecture Notes in Computer Science, pp. 186-194, Springer-Verlag, New York, 1987.

[6] A. J. Menezes, P. C. van Oorschot, and S. A. Vanstone. Handbook of Applied Cryptography, CRC Press, 1997.

[7] T. Pedersen. A threshold cryptosystem without a trusted party, *Advances in Cryptology—EUROCRYPT '91*, Lecture Notes in Computer Science, pp. 522-526, Springer-Verlag, 1991.

[8] K. Sako, J. Kilian. Receipt-free mix-type voting scheme—A practical solution to the implementation of a voting booth, *Advances in Cryptology—EUROCRYPT '95*, Lecture Notes in Computer Science, Springer-Verlag, 1995.

Figure 1:
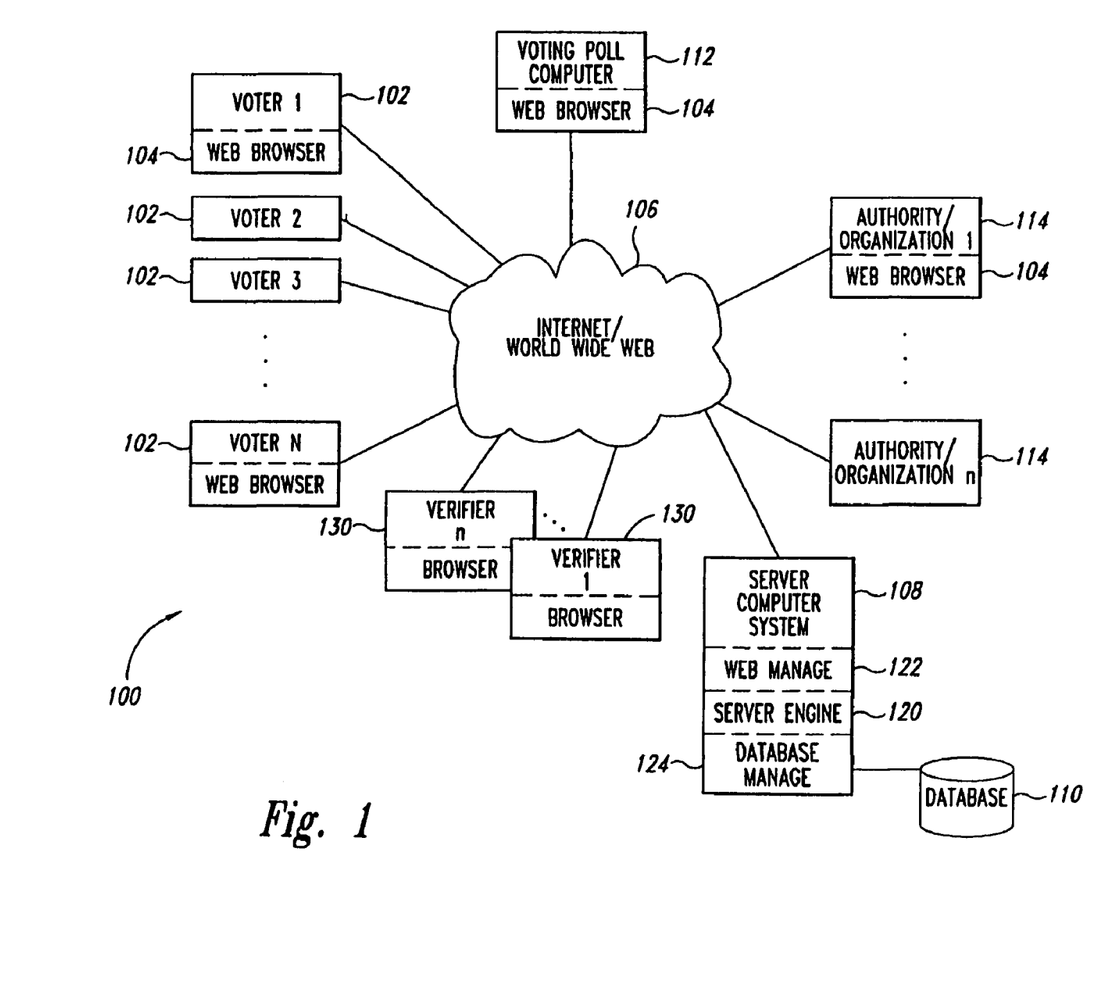

FIG. 1 and the following discussion provide a brief, general description of a suitable computing environment in which aspects of the invention can be implemented. Although not required, embodiments of the invention may be implemented as computer-executable instructions, such as routines executed by a general-purpose computer, such as a personal computer or web server. Those skilled in the relevant art will appreciate that aspects of the invention (such as small elections) can be practiced with other computer system configurations, including Internet appliances, hand-held devices, wearable computers, personal digital assistants ("PDAs"), multiprocessor systems, microprocessor-based or programmable consumer electronics, network PCs, mini computers, cell or mobile phones, set-top boxes, mainframe computers, and the like. Aspects of the invention can be embodied in a special purpose computer or data processor that is specifically programmed, configured or constructed to perform one or more of the computer-executable instructions explained herein. Indeed, the term "computer," as generally used herein, refers to any of the above devices, as well as any data processor.

The invention can also be practiced in distributed computing environments where tasks or modules are performed by remote processing devices, which are linked through a communications network, such as a Local Area Network (LAN), Wide Area Network (WAN), or the Internet. In a distributed computing environment, program modules or sub-routines may be located in both local and remote memory storage devices. The invention described herein may be stored or distributed on computer-readable media, including magnetic and optically readable and removable computer disks, stored as firmware in chips, as well as distributed electronically over the Internet or other networks (including wireless networks). Those skilled in the relevant art will recognize that portions of the protocols described herein may reside on a server computer, while corresponding portions reside on client computers. Data structures and transmission of data particular to such protocols are also encompassed within the scope of the invention.

Unless described otherwise, the construction and operation of the various blocks shown in FIG. 1 are of conventional design. As a result, such blocks need not be described in further detail herein, as they will be readily understood by those skilled in the relevant art.

Referring to FIG. 1, a suitable environment of system 100 includes one or more voter or client computers 102, each of which includes a browser program module 104 that permits the computer to access and exchange data with the Internet, including web sites within the World Wide Web portion 106 of the Internet. The voter computers 102 may include one or more central processing units or other logic processing circuitry, memory, input devices (e.g., keyboards, microphones, touch screens, and pointing devices), output devices (e.g., display devices, audio speakers and printers), and storage devices (e.g., fixed, floppy, and optical disk drives), all well known but not shown in FIG. 1. The voter computers 102 may also include other program modules, such as an operating system, one or more application programs (e.g., word processing or spread sheet applications), and the like. As shown in FIG. 1, there are N number of voter computers 102, representing voters 1, 2, 3 . . . N.

A server computer system 108 or "vote collection center," coupled to the Internet or World Wide Web ("Web") 106, performs much or all of the ballot collection, storing and other processes. A database 110, coupled to the server computer 108, stores much of the web pages and data (including ballots and shuffle validity proofs) exchanged between the voter computers 102, one or more voting poll computers 112 and the server computer 108. The voting poll computer 112 is a personal computer, server computer, mini-computer, or the like, positioned at a public voting location to permit members of the public, or voters who may not have ready access to computers coupled to the Internet 106, to electronically vote under the system described herein. Thus, the voter computers 102 may be positioned at individual voter's homes, where one or more voting poll computers 112 are located publicly or otherwise accessible to voters in a public election. The voting poll computer 112 may include a local area network (LAN) having one server computer and several client computers or voter terminals coupled thereto via the LAN to thereby permit several voters to vote simultaneously or in parallel. Note also that the term "voter" is generally used herein to refer to any individual or organization that employs some or all of the protocols described herein.

Under an alternative embodiment, the system 100 may be used in the context of a private election, such as the election of corporate officers or board members. Under this embodiment, the voter computers 102 may be laptops or desktop computers of shareholders, and the voting poll computer 112 can be one or more computers positioned within the company (e.g., in the lobby) performing the election. Thus, shareholders may visit the company to access the voting poll computer 112 to cast their votes.

One or more authority or organization computers 114 are also coupled to the server computer system 108 via the Internet 106. If a threshold cryptosystem is employed, then the authority computers 114 each hold a key share necessary to decrypt the electronic ballots stored in the database 110. Threshold cryptographic systems require that a subset t of the total number of authorities n (i.e., t<n) agree to decrypt the ballots, to thereby avoid the requirement that all authorities are needed for ballot decryption. In other words, the objective of a threshold cryptosystem is to share a private key, s, among n members of a group such that messages can be decrypted when a substantial subset, T, cooperate—a (t, n) threshold cryptosystem. Protocols are defined to (1) generate keys jointly among the group, and (2) decrypt messages without reconstructing the private key. The authority computers 114 may provide their decryption share to the server computer system 108 after the voting period ends so that the server computer system may decrypt the ballots and tally the results.

Furthermore, under the depicted embodiment, each of the authority computers may perform one shuffle of the ballots, as described herein. In conjunction with each shuffle, each authority computer generates a shuffle validity proof, which may be encrypted and forwarded to the server computer 108, or stored locally by the authority computer. In an alternative embodiment, an additional set of authority computers are provided, where one set of authority computers shuffle the encrypted ballots and generate shuffle validity proofs, while the second set of authority computers employ keys shares for decrypting the ballots.

One or more optional verifier computers 130 may also be provided, similar to the authority computers 114. The verifier computers may receive election transcripts to verify that the election has not been compromised. For example, the verifier computers may receive the shuffle validity proofs from each of the authority computers, as described herein. The verifier computers may perform verifications after the election, and need not be connected to the Internet. Indeed, the verifications may be performed by other computers shown or described herein.

The server, verifier or authority computers may perform voter registration protocols, or separate registration computers may be provided (not shown). The registration computers may include biometric readers for reading biometric data of registrants, such as fingerprint data, voice fingerprint data, digital picture comparison, and other techniques known by those skilled in the relevant art. Voter registration and issuing anonymous certificates for use with verifiable shuffles is described below.

The server computer 108 includes a server engine 120, a web page management component 122, a database management component 124, as well as other components not shown. The server engine 120 performs, in addition to standard functionality, portions of an electronic voting protocol. The encryption protocol may be stored on the server computer, and portions of such protocol also stored on the client computers, together with appropriate constants. Indeed, the above protocol may be stored and distributed on computer readable media, including magnetic and optically readable and removable computer disks, microcode stored on semiconductor chips (e.g., EEPROM), as well as distributed electronically over the Internet or other networks. Those skilled in the relevant art will recognize that portions of the protocol reside on the server computer, while corresponding portions reside on the client computer. Data structures and transmission of data particular to the above protocol are also encompassed within the present invention. Thus, the server engine 120 may perform all necessary ballot transmission to authorized voters, ballot collection, verifying ballots (e.g., checking digital signatures and passing verification of included proofs of validity in ballots), vote aggregation, ballot decryption and/or vote tabulation. Under an alternative embodiment, the server engine 120 simply collects all electronic ballots as a data collection center. The electronic ballots are then stored and provided to a third party organization conducting the election, such as a municipality, together with tools to shuffle ballots, decrypt the tally and produce election results. Likewise, election audit information, such as shuffle validity proofs and the like may be stored locally or provided to a municipality or other organization.

The web page component 122 handles creation and display or routing of web pages such as an electronic ballot box web page, as described below. Voters and users may access the server computer 108 by means of a URL associated therewith, such as http:\\www.votehere.net, or a URL associated with the election, such as a URL for a municipality. The municipality may host or operate the server computer system 108 directly, or automatically forward such received electronic ballots to a third party vote authorizer who may operate the server computer system. The URL, or any link or address noted herein, can be any resource locator.

The web page management process 122 and server computer 108 may have secure sections or pages that may only be accessed by authorized people, such as authorized voters or system administrators. The server computer 108 may employ, e.g., a secure socket layer ("SSL") and tokens or cookies to authenticate such users. Indeed, for small elections, or those where the probability of fraud is low (or results of fraud are relatively inconsequential), the system 100 may employ such simple network security measures for gathering and storing votes as explained below, rather than employing complex electronic encrypted ballots, as described in the above-noted patent application. Methods of authenticating users (such as through the use of passwords), establishing secure transmission connections, and providing secure servers and web pages are known to those skilled in the relevant art.

The election scheme and system may use a "bulletin board" where each posting is digitally signed and nothing can be erased. The bulletin board is implemented as a web server. The "ballot box" resides on the bulletin board and holds all of the encrypted ballots. Erasing can be prevented by writing the web server data to a write-once, read-many (WORM) permanent storage medium or similar device.

Note that while one embodiment of the invention is described herein as employing the Internet to connect computers, other alternative embodiments are possible. For example, aspects of the invention may be employed by stand alone computers. Aspects of the invention may also be employed by any interconnected data processing machines. Rather than employing a browser, such machines may employ client software for implementing aspects of the methods or protocols described herein.

Figure 2:
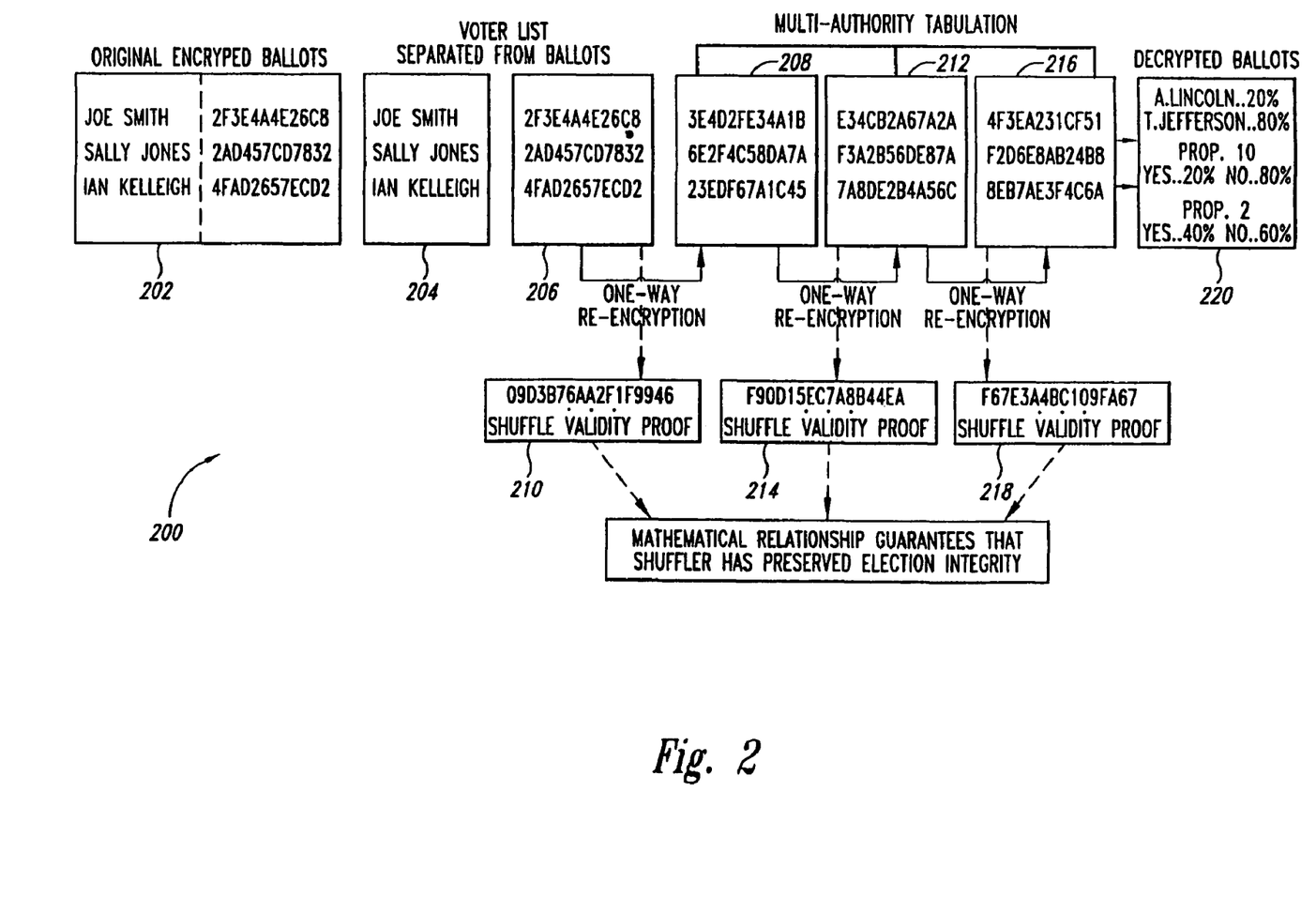

Referring to FIG. 2, a schematic diagram illustrates a basic application of the shuffle protocol to an election, shown as a method 200. In block 202, three encrypted ballots are submitted, one each for voters Joe Smith, Sally Jones, and Ian Kelleigh. In block 204, the list or roll of voters is separated from the encrypted ballots, which are shown in block 206. Thereafter, a one-way reencryption of the ballots is performed to produce a shuffled set of ballots, shown in block 208. A shuffle validity proof is generated based on this first shuffle, shown in block 210. The shuffle validity proof allows a third party to ensure that all input data (the ballots) had the same operation applied to them, and that no altering of the ballots had been performed.

A second shuffle of the (previously shuffled) ballots is performed, to generate a second shuffled set of ballots, shown as block 212. Again, a shuffle validity proof is generated, shown in block 214. The shuffled ballots of block 212 are shuffled a third time, to produce a final shuffled set of ballots under block 216. A third validity proof 218 is likewise generated based on the third shuffle. In sum, a three-by-three shuffle array is provided under this example. Following, the shuffling, the ballots are decrypted to produce a tally, shown as block 220: A third party may verify that the election by analyzing, among other things, each shuffle validity proof to ensure that each shuffler has preserved election integrity.

The shuffle protocol is presented above as effectively separate subroutines that may be employed for various applications, such as in a electronic voting scheme. A first subroutine provides the functionality of scaled, iterated, logarithmic multiplication proofs between a prover and a verifier. A second subroutine provides the functionality of a simple shuffle protocol and employs the scaled, iterated, logarithmic multiplication proofs. Thereafter, a third subroutine implements general shuffle functionality, where the shuffler does not know the exponents, building upon the second subroutine of the simple shuffle. A fourth subroutine extends the third subroutine to shuffling k tuples of elements. Other routines are of course also provided.

One skilled in the art will appreciate that the concepts of the invention can be used in various environments other than the Internet. For example, the concepts can be used in an electronic mail environment in which electronic mail ballots, transactions, or forms are processed and stored. In general, a web page or display description (e.g., the bulletin board) may be in HTML, XML or WAP format, email format, or any other format suitable for displaying information (including character/code based formats, bitmapped formats and vector based formats). Also, various communication channels, such as local area networks, wide area networks, or point-to-point dial-up connections, may be used instead of the Internet. The various transactions may also be conducted within a single computer environment, rather than in a client/server environment. Each voter or client computer may comprise any combination of hardware or software that interacts with the server computer or system. These client systems may include television-based systems, Internet appliances, mobile phones/PDA's and various other consumer products through which transactions can be performed.

In general, as used herein, a "link" refers to any resource locator identifying a resource on the network, such as a display description of a voting authority having a site or node on the network. In general, while hardware platforms, such as voter computers, terminals and servers, are described herein, aspects of the invention are equally applicable to nodes on the network having corresponding resource locators to identify such nodes.

Unless the context clearly requires otherwise, throughout the description and the claims, the words 'comprise,' 'comprising,' and the like are to be construed in an inclusive sense as opposed to an exclusive or exhaustive sense; that is to say, in the sense of "including, but not limited to." Words using the singular or plural number also include the plural or singular number, respectively. Additionally, the words "herein," "above," "below" and words of similar import, when used in this application, shall refer to this application as a whole and not to any particular portions of this application.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other encryption applications, not only the electronic voting system described above. For example, the protocol has applications in electronic commerce where both anonymity and auditability are requirements. Examples of this are electronic payment schemes ("e-cash").

These and other changes can be made to the invention in light of the above detailed description. In general, in the following claims, the terms used should not be construed to limit the invention to the specific embodiments disclosed in the specification and the claims, but should be construed to include all encryption systems and methods that operate under the clams to provide data security. Accordingly, the invention is not limited by the disclosure, but instead the scope of the invention is to be determined entirely by the claims.

While certain aspects of the invention are presented below in certain claim forms, the inventor contemplates the various aspects of the invention in any number of claim forms. For example, while only one aspect of the invention is recited as embodied in a computer-readable medium, other aspects may likewise be embodied in computer-readable medium. Accordingly, the inventor reserves the right to add additional claims after filing the application to pursue such additional claim forms for other aspects of the invention.

I claim:

1. A computer system for receiving a sequence of elements, comprising:
   a computer coupled to a computer network and configured to:
   receive a sequence of electronic data elements representing individual data files,
   apply a cryptographic transformation using at least a first secret value to anonymously permute the sequence of electronic data elements and produce a first shuffled sequence of electronic data elements, wherein the server computer knows a correspondence between the first shuffled sequence of electronic data elements and the sequence of electronic data elements, and
   generate a first proof of correctness for the first shuffled sequence of electronic data elements based on an iterated logarithmic multiplication proof employing a binary operator, wherein each of the data elements in the sequence of data elements is associated with a common base value, and wherein verifying the proof of correctness employs a three-move, public coin proof of knowledge wherein in response to a verifying request, the computer computes a series of exponents by solving an associated series of linear equations.

2. The system of claim 1 wherein the received sequence of electronic data elements are encrypted using $Z_p$ or elliptic curve groups using a key unknown to the computer, and wherein the computer is further configured to:

receive a series of randomly generated values $e_i$ from a verifier computer;
secretly generate a series of values $D_i$ based on a secret, one-way cryptographic transformation that employs the received series of values $e_i$ and secretly generated values;
permute the sequence of electronic data elements to produce the first shuffled sequence of elements based on the series of values $D_i$ and a secret value $\gamma$; and
provide the values $D_i$ and a series of proof values based on the cryptographic transformation as a proof of knowledge that the server computer has access to how the cryptographic transformation permuted the sequence of electronic data elements to produce the first shuffled sequence of elements without revealing the cryptographic transformation to the verifier computer.

3. The system of claim 1 wherein the server computer is further configured for:
   receiving a plurality of public keys from a corresponding plurality of individuals, wherein each of the plurality of individuals have a private key corresponding to one of the plurality of public keys;
   receiving a request from one of the plurality of individuals having a one private key;
   providing at least a subset of the plurality of public keys to the requesting individual;
   receiving a file and a shuffle of the plurality of public keys and a proof of correctness for the shuffled public keys based on an iterated logarithmic multiplication proof and a value corresponding to the one private key, wherein the value is associated with the file and provides proof that the one individual has knowledge of the one private key without revealing the one private key;
   checking the proof of correctness;
   checking that the value is mathematically related to a one of the public keys and the file; and
   reducing the plurality of public keys by the one public key.

4. The system of claim 1 wherein the sequence of electronic elements are public keys, and wherein the server if further configured to check, in response to a request from an individual, that the individual has a value uniquely and mathematically related to a one of the public keys; and
   if so, issue a certificate to the one individual.

5. A computer-implemented cryptographic method between a prover computer and a verifier computer, the method comprising:
   secretly shuffling a first series of electronic data elements with respect to a second series of electronic data elements to produce a shuffled set;
   generating a proof of correctness for the shuffled set based on proving that a first set of roots for a first polynomial equation is equal to a fixed constant multiple of a second set of roots for a second polynomial equation; and
   wherein the proof of correctness that the first set of roots is equal to a fixed multiple of the second sets of roots is obtained by: specifying a second fixed constant, evaluating the first polynomial equation at a first random point to obtain a first value, evaluating the second polynomial equation at the first random point to obtain a second value, and determining that the second value is equal to a product of the first value and the second fixed constant.

6. The method of claim 5 wherein at least some of the elements in the first sequence of elements are electronic ballots.

7. The method of claim 5 wherein at least some of the elements in the shuffled set are ElGamal pairs.

8. The method of claim 5, further comprising repeating the secretly shuffling, generating and providing for I-tuple of elements in an input sequence of elements.

9. The method of claim 5 wherein secretly shuffling the first series of elements includes receiving a subset of a set of identifying elements, wherein each identifying element in the set corresponds to an individual, and wherein the method further comprises:
    receiving an anonymous certificate if the verifying computer verifies the proof of correctness.

10. A computer system for receiving a sequence of elements, comprising:
    a server computer coupled to a computer network and configured to:
        receive a sequence of electronic data elements representing individual data files,
        apply a cryptographic transformation using at least a secret key to anonymously permute the sequence of electronic data elements and produce a shuffled sequence of electronic data elements, wherein the server computer knows a correspondence between the shuffled sequence of electronic data elements and the sequence of electronic data elements,
    wherein the server computer is further configured to:
        generate a proof of correctness for the permutation based on a proof that the product of unencrypted values of elements of a first sequence of encrypted data elements is equal to the product of unencrypted values of elements of a second sequence of encrypted data elements.

11. The system of claim 10 wherein the received sequence of electronic data elements are encrypted using $Z_p$ or elliptic curve groups using a key unknown to the server computer, and wherein the server computer is further configured to:
    receive a series of randomly generated values $e_i$ from a verifier computer; and
    generate the proof of correctness as an non-interactive proof based at least in part on at least some of the randomly generated values $e_i$.

12. The system of claim 10 wherein the server computer is further configured for:
    receiving a plurality of public keys from a corresponding plurality of individuals, wherein each of the plurality of individuals have a private key corresponding to one of the plurality of public keys;
    receiving a request for a certificate from one of the plurality of individuals having a one private key;
    providing at least a subset of the plurality of public keys to the requesting individual;
    receiving a shuffle of the plurality of public keys and a non-interactive proof of correctness for the permutation based on a proof that the product of unencrypted values of elements of a first sequence of encrypted data elements is equal to the product of unencrypted values of elements of a second sequence of encrypted data elements;
    checking the proof of correctness;
    issuing a certificate to the one individual; and
    reducing the plurality of public keys by the one public key.

13. The system of claim 10 wherein the sequence of electronic elements are public keys, and wherein the server is further configured to check, in response to a request from an individual, that the individual has a secret key uniquely and mathematically related to a one of the public keys; and
    if so, issue a certificate to the one individual.

14. The system of claim 10 wherein the sequence of electronic data elements is a sequence of ballot choices under an electronic election.

15. The system of claim 10 wherein the proof of correctness proves that given the sequence of electronic data elements and the produced shuffled sequence of electronic data elements, there exists a permutation such that for every decrypted element in the sequence of electronic data elements there exists a corresponding permuted decrypted element in the produced shuffled sequence of electronic data elements.

16. The system of claim 10 wherein the proof of correctness for the permutation is based on a proof that one polynomial defined by a first sequence of encrypted linear factors is equal to a constant multiple of a second polynomial defined by a second sequence of encrypted linear factors.

17. A computer-readable medium whose contents store a sequence of electronic data elements and associated data, wherein the sequence of electronic data elements are processed by a computer-implemented method for a shuffling of the sequence of electronic data elements, the method comprising:
    receiving the sequence of electronic data elements;
    applying a secret, one-way cryptographic transformation using at least a first secret key to anonymously permute the sequence of electronic data elements and producing a first shuffled sequence of electronic data elements; and
    generating a proof of correctness for the permutation based on a proof that the product of unencrypted values of elements of a first sequence of encrypted data elements is equal to the product of unencrypted values of elements of a second sequence of encrypted data elements.

18. The computer-readable medium of claim 17 wherein the received sequence of electronic data elements are encrypted with an underlying mathematical group being a ring of integers having a modulus integer value p(Zp).

19. The computer-readable medium of claim 17 wherein the computer-readable medium is logical node in a computer network receiving the sequence of electronic data elements and the proof of correctness.

20. The computer-readable medium of claim 17 wherein the computer-readable medium is computer-readable disk.

21. The computer-readable medium of claim 17 wherein the computer-readable medium is a memory of a computer system.

22. The computer-readable medium of claim 17 wherein the computer-readable medium is an Internet connection link to a voting authority server computer.

23. The computer-readable medium of claim 17 wherein the electronic data elements include at least public keys or digital certificates associated with public keys.

24. The computer-readable medium of claim 17 wherein the sequence of electronic data elements are electronic ballots or electronic ballot choices.

25. The computer-readable medium of claim 17 wherein the received sequence of electronic data elements are encrypted with an underlying elliptic curve group.

26. The computer-readable medium of claim 17 wherein the proof of correctness is a non-interactive proof of correctness.

* * * * *

UNITED STATES PATENT AND TRADEMARK OFFICE
CERTIFICATE OF CORRECTION

| | | |
|---|---|---|
| PATENT NO. | : 7,360,094 B2 | Page 1 of 1 |
| APPLICATION NO. | : 10/484931 | |
| DATED | : April 15, 2008 | |
| INVENTOR(S) | : Neff | |

It is certified that error appears in the above-identified patent and that said Letters Patent is hereby corrected as shown below:

In column 7, line 55, delete "w" and insert -- $\omega$ --, therefor.

In column 7, line 58, delete "K" and insert -- k --, therefor.

In column 8, line 7, delete "$x_{i=\log g}$" and insert -- $x_i = \log_g$ --, therefor.

In column 10, line 34, delete "all" and insert -- an --, therefor.

In column 11, line 48, delete "$A_i B_i te^i$" and insert -- $A_i B_i^{te_i}$ --, therefor.

In column 13, line 55, delete "$A_i B_i ce^i$" and insert -- $A_i B_i^{ce_i}$ --, therefor.

In column 13, line 55, delete "$_{ci}D_i c$." and insert -- $C_i D_i^c$. --, therefor.

In column 13, line 65, delete "$U_i R_i A_i$" and insert -- $U_i R_i / A_i$ --, therefor.

In column 13, line 66, delete "$W_i S_i C_i$" and insert -- $W_i S_i / C_i$ --, therefor.

In column 15, line 42, delete "V" and insert -- D --, therefor.

In column 16, line 16, delete "seperate" and insert -- separate --, therefor.

In column 23, line 26, delete "clams" and insert -- claims --, therefor.

In column 25, line 7, in Claim 8, delete "l-tuple" and insert -- I-tuple --, therefor.

Signed and Sealed this

Twenty-third Day of September, 2008

JON W. DUDAS
*Director of the United States Patent and Trademark Office*